United States Patent
Niiya et al.

(10) Patent No.: US 7,039,019 B2
(45) Date of Patent: May 2, 2006

(54) TELEPHONE EXCHANGING APPARATUS AND TELEPHONE SYSTEM

(75) Inventors: Norimasa Niiya, Hino (JP); Koji Shima, Sagamihara (JP); Yoichi Naito, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 989 days.

(21) Appl. No.: 10/105,254

(22) Filed: Mar. 26, 2002

(65) Prior Publication Data

US 2002/0141354 A1    Oct. 3, 2002

(30) Foreign Application Priority Data

Mar. 27, 2001 (JP) .......................... P2001-089942
Jan. 22, 2002 (JP) .......................... P2002-013396

(51) Int. Cl.
    *H04L 12/16*      (2006.01)
    *H04Q 11/00*      (2006.01)

(52) U.S. Cl. ...................... 370/262; 370/260; 370/261; 370/263; 370/389; 379/158; 379/202.01; 379/203.01; 379/205.01; 379/207.01; 379/160; 379/157; 709/204; 709/202; 709/227; 709/228; 709/229

(58) Field of Classification Search ...................... None
See application file for complete search history.

(56) References Cited

U.S. PATENT DOCUMENTS 4,796,293 A * 1/1989 Blinken et al. ........ 379/202.01
5,323,445 A * 6/1994 Nakatsuka ............... 348/14.09
5,373,549 A * 12/1994 Bales et al. .............. 379/93.21
5,619,555 A    4/1997 Fenton et al. ................ 379/67
5,903,629 A * 5/1999 Campbell et al. ........ 379/88.24

FOREIGN PATENT DOCUMENTS

| EP | 0 502 547 A2 | 9/1992 |
| EP | 0 604 053 A1 | 6/1994 |
| EP | 0 687 088 A2 | 12/1995 |
| EP | 0 713 319 A2 | 5/1996 |
| GB | 2 349 298 | 10/2000 |
| JP | 5-153259 | 6/1993 |
| JP | 7-154488 | 6/1995 |
| JP | 9-107587 | 4/1997 |
| JP | 11-261637 | 9/1999 |
| JP | 2000-349756 | 12/2000 |
| WO | WO 98/13995 | 4/1998 |

* cited by examiner

*Primary Examiner*—Wellington Chin
*Assistant Examiner*—Raj Jain
(74) *Attorney, Agent, or Firm*—Finnegan, Henderson, Farabow, Garrett & Dunner, L.L.P.

(57) ABSTRACT

A telephone exchanging apparatus 30 comprises a joined terminal table 341, a joined terminal table operating portion 352, and a reception side designating portion 355. The joined terminal table 341 stores terminal identification information that identifies a telephone terminal 40 that will join a conference. The joined terminal table operating portion 352 operates the joined terminal table 341 corresponding to joined terminal table operation commanding information. The reception side designating portion 355 designates the reception side of a speech packet transmitted from the telephone terminal 40. Since the joined terminal table 341 is operated by the joined terminal table operating portion 352, even if the number of people who join a conference increases, they can be easily added or deleted.

15 Claims, 11 Drawing Sheets

| CONFERENCE IDENTIFICATION INFORMATION | TERMINAL IDENTIFICATION INFORMATION |
|---|---|
| GROUP 1 | A<br>B<br>C |
| GROUP 2 | D<br>E<br>F |

| TERMINAL IDENTIFICATION INFORMATION | TERMINAL STATE INFORMATION |
|---|---|
| A | SEATING |
| B | SEATING |
| C | SEATING |
| D | NOT SEATING |
| E | SPEAKING |
| F | SEATING |

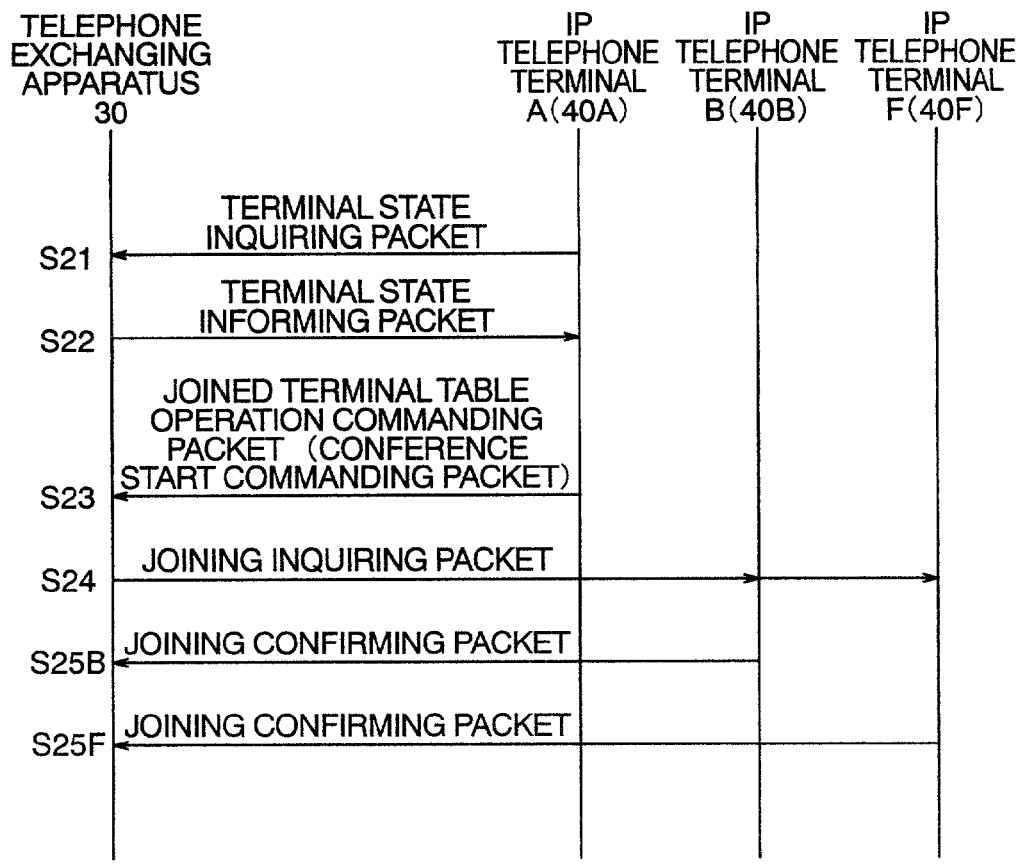

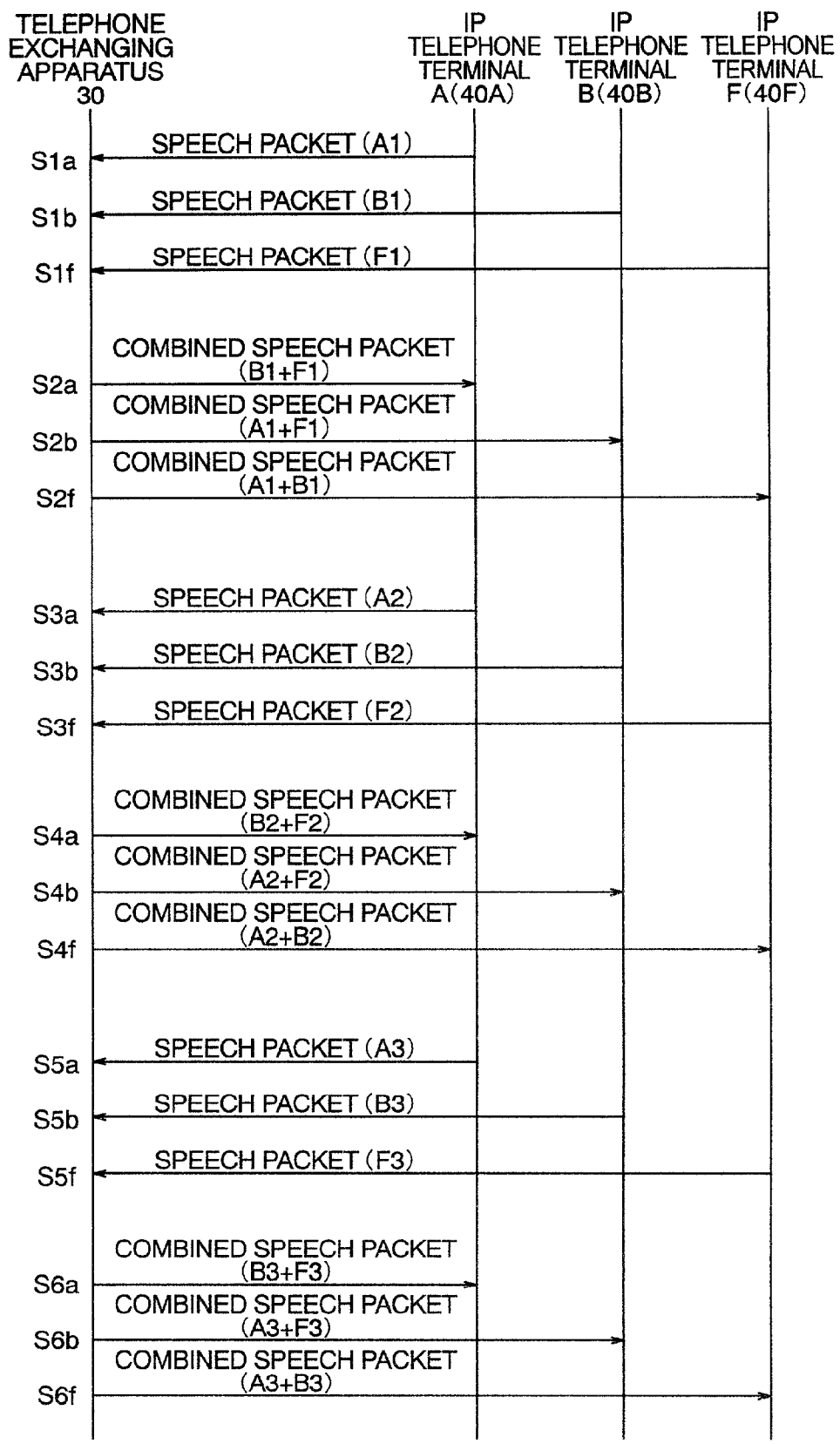

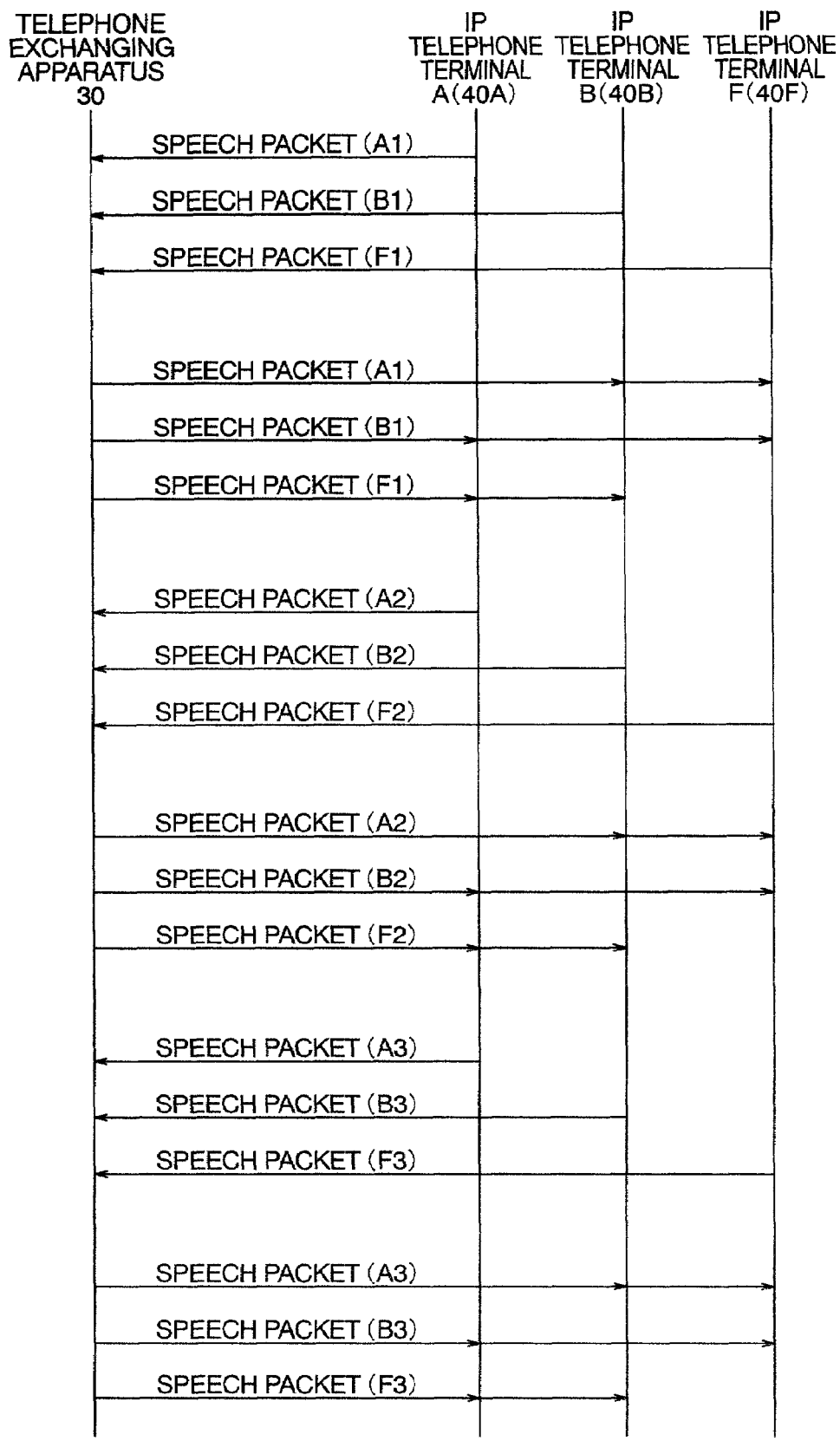

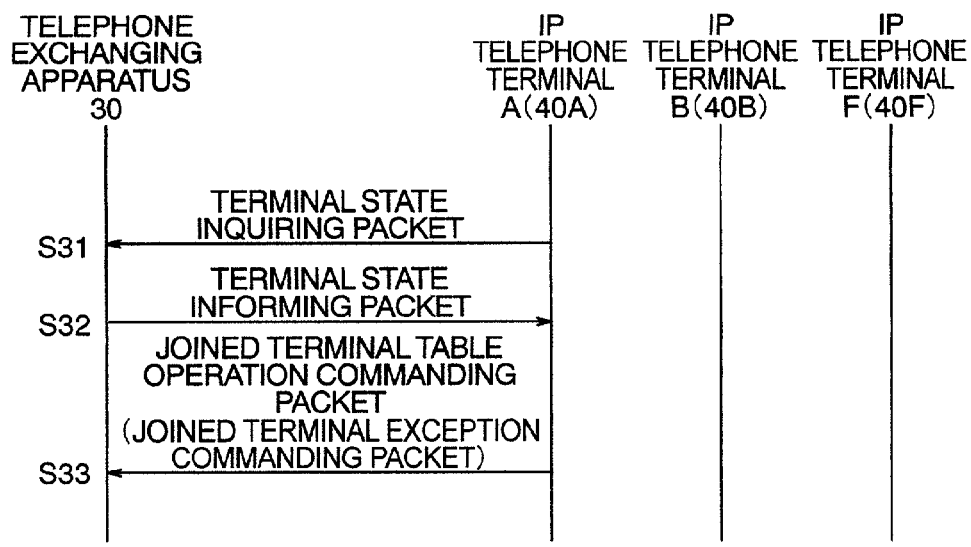
FIG. 11A
| CONFERENCE IDENTIFICATION INFORMATION | TERMINAL IDENTIFICATION INFORMATION |
|---|---|
| GROUP 1 | A<br>B<br>F |
FIG. 11B
| CONFERENCE IDENTIFICATION INFORMATION | TERMINAL IDENTIFICATION INFORMATION |
|---|---|
| GROUP 1 | A<br>F |
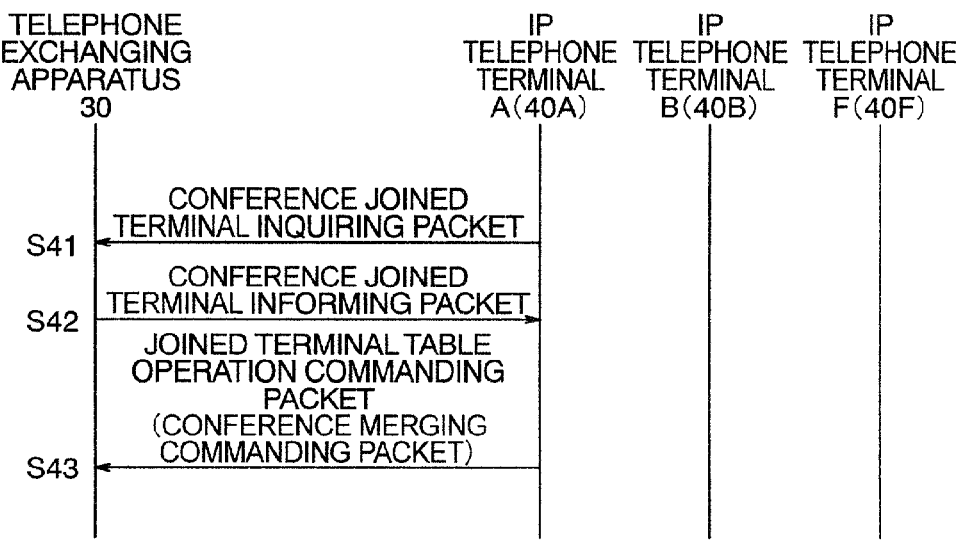

FIG. 13A

| CONFERENCE IDENTIFICATION INFORMATION | TERMINAL IDENTIFICATION INFORMATION |
|---|---|
| GROUP 1 | A<br>B<br>C |
| GROUP 2 | D<br>E<br>F |

FIG. 13B

| CONFERENCE IDENTIFICATION INFORMATION | TERMINAL IDENTIFICATION INFORMATION |
|---|---|
| GROUP 3 | A<br>B<br>C<br>D<br>E<br>F |

FIG. 14

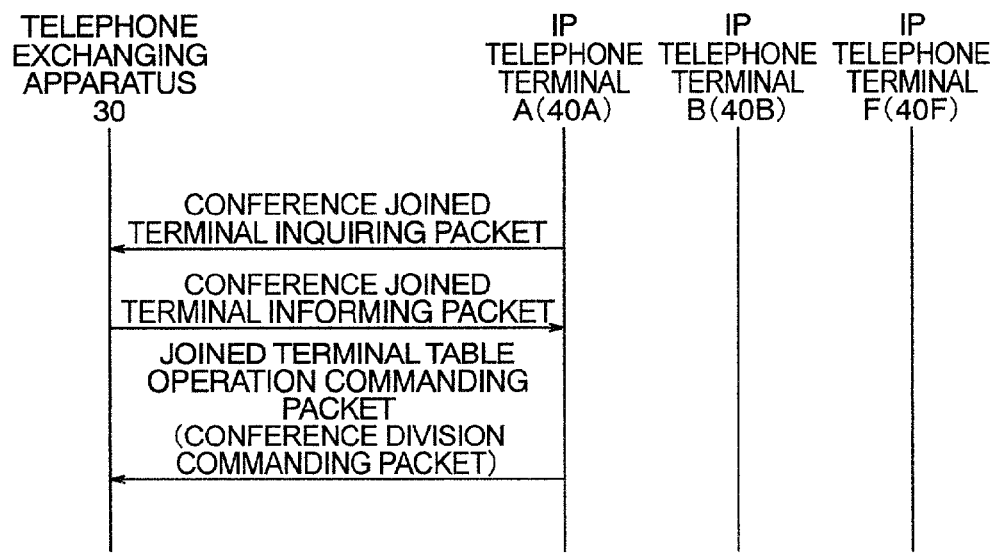

FIG. 15A

| CONFERENCE IDENTIFICATION INFORMATION | TERMINAL IDENTIFICATION INFORMATION |
|---|---|
| GROUP 3 | A<br>B<br>C<br>D<br>E<br>F |

FIG. 15B

| CONFERENCE IDENTIFICATION INFORMATION | TERMINAL IDENTIFICATION INFORMATION |
|---|---|
| GROUP 4 | A<br>B |
| GROUP 5 | C<br>D<br>E<br>F |

| CONFERENCE IDENTIFICATION INFORMATION | TERMINAL IDENTIFICATION INFORMATION | JOINING INFORMATION | AUTHORIZING INFORMATION |
|---|---|---|---|
| GROUP 1 | A | JOINING | PRESENCE OF AUTHORITY |
|  | B | JOINING | ABSENCE OF AUTHORITY |
|  | C | NOT JOINING | ABSENCE OF AUTHORITY |
| GROUP 2 | D | JOINING | PRESENCE OF AUTHORITY |
|  | E | NOT JOINING | ABSENCE OF AUTHORITY |
|  | F | JOINING | ABSENCE OF AUTHORITY |

FIG. 19

| CONFERENCE IDENTIFICATION INFORMATION | TERMINAL IDENTIFICATION INFORMATION | JOINING INFORMATION | AUTHORITY INFORMATION |
|---|---|---|---|
| GROUP 1 | A | JOINING | PRESENCE OF AUTHORITY |
|  | B | NOT JOINING | ABSENCE OF AUTHORITY |
|  | C | NOT JOINING | ABSENCE OF AUTHORITY |
|  | F | NOT JOINING | ABSENCE OF AUTHORITY |

FIG. 20

| CONFERENCE IDENTIFICATION INFORMATION | TERMINAL IDENTIFICATION INFORMATION | JOINING INFORMATION | AUTHORITY INFORMATION |
|---|---|---|---|
| GROUP 1 | A | JOINING | PRESENCE OF AUTHORITY |
|  | B | JOINING | ABSENCE OF AUTHORITY |
|  | C | NOT JOINING | ABSENCE OF AUTHORITY |
|  | F | JOINING | ABSENCE OF AUTHORITY |

TELEPHONE EXCHANGING APPARATUS AND TELEPHONE SYSTEM

CROSS REFERENCE TO THE INVENTION

This application is based upon and claims the benefit of priority from the prior Japanese Patent Applications No. 2002-13396, filed on Jan. 22, 2002 and No. 2001-89942, filed on Mar. 27, 2001; the entire contents of which are incorporated herein by reference.

BACKGROUND OF THE INVENTION

1. Field of the Invention

The present invention relates to a telephone exchanging apparatus and a telephone system, in particular, to those that allow a conference to be held using packets.

2. Description of the Related Art

A telephone system that uses button telephones is known. A button telephone used in the telephone system is provided with a conference key. By operating the conference key, the user can join a conference and talk to a plurality of users who join the conference (for an example of this related art, refer to Japanese Patent Laid-Open Publication No. 2000-349756).

SUMMARY OF THE INVENTION

In such a telephone system, each user should perform an operation necessary for joining a conference. Thus, to allow a plurality of people to be joined to a conference, the operation should be repeated the number of times corresponding to the number of people who are joined to the conference. Thus, the operation is troublesome. In addition, when a plurality of people are excepted from the conference, the operation should be repeated the number of times corresponding to the number of people to be excepted from the conference. Thus, as the number of people who join a conference increases, the operation necessary for joining or excepting the conference becomes difficult.

The present invention is made from the above-described point of view. An object of the present invention is to provide a telephone system that allows people to be easily joined to a conference and excepted therefrom even if the number of people is increased.

(1) To accomplish the aforementioned object, a first aspect of the present invention is a telephone exchanging apparatus to which a plurality of telephone terminals are connected, the apparatus including:

a joined terminal table that stores terminal identification information that identifies a telephone terminal that joins a conference;

a joined terminal table operating portion that operates the joined terminal table corresponding to joined terminal table operation commanding information that causes the joined terminal table to be operated;

a receiving portion that receives a speech packet that contains voice information transmitted form a telephone terminal;

a reception side designating portion that designates the reception side of the speech packet received by the receiving portion, the reception side corresponding to terminal identification information stored in the joined terminal table, a telephone terminal being designated as the reception side of the speech packet so that the reception side of the speech packet differs from the transmission side of the speech packet; and a transmitting portion that transmitting the speech packet to the reception side designated by the reception side designating portion.

The telephone exchanging apparatus includes the joined terminal table operating portion. Thus, when the joined terminal table operation commanding packet that contains joined terminal table operation commanding information is transmitted from a telephone terminal to the telephone exchanging apparatus, the joined terminal table can be rewritten so that a telephone terminal that will be joined to a conference can be added or excepted therefrom.

a. The joined terminal table can store conference identification information that identifies a conference. Corresponding to the conference identification information, the joined terminal table for a plurality of conferences can be operated.

b. The speech packet can contain conference identification information that identifies a conference. Corresponding to the conference identification information, speeches of a plurality of conferences can be identified.

c. The telephone exchanging apparatus may further include a combined speech packet generating portion that generates a combined speech packet of which a plurality of speech packets are combined. By combining a plurality of speech packets, information can be effectively transmitted.

d. The telephone exchanging apparatus may further include a joined terminal informing portion that informs of a telephone terminal that will join the conference the transmission side of joining terminal inquiring information that inquires the telephone terminal that will join the conference corresponding to the joined terminal table. When a telephone terminal transmits to the telephone exchanging apparatus a joined terminal inquiring packet that contains joined terminal inquiring information, the telephone terminal can know telephone terminals that are joining the conference.

e. The telephone exchanging apparatus may further include a terminal state recognizing portion that recognizes the states of the telephone terminals, a terminal state table that stores terminal state information of the telephone terminals recognized by the terminal state recognizing portion, and a terminal state informing portion that informs of the states of the telephone terminals the transmission side of terminal state inquiring information that inquires the states of the telephone terminals corresponding to the terminal state table. When a telephone terminal transmits to the telephone exchanging apparatus a terminal state inquiring packet that contains terminal state inquiring information, the telephone terminal can know the states of the other telephone terminals.

When a packet has not been received from a telephone terminal in a predetermined time period, the terminal state recognizing portion can recognize that the terminal state of the telephone terminal is not seating.

When a speech packet has been received from a telephone terminal, the terminal state recognizing portion can recognize that the terminal state of the telephone terminal is speaking.

When an on-hook packet that represents the handset has been hooked on has been received from a telephone terminal, the terminal state recognizing portion can recognize that the terminal state of the telephone terminal is seating.

(2) A second aspect of the present invention is a telephone exchanging apparatus to which a plurality of telephone terminals are connected, the apparatus including:

a joined terminal table that stores terminal identification information and conference identification information, the terminal identification information identifying a telephone terminal that will join a conference, the conference identification information identifying a conference;

a joined terminal table operating portion that performs at least one of a conference dividing operation and a conference merging operation for the joined terminal table corresponding to joined terminal table operation commanding information that causes the joined terminal table to be operated;

a receiving portion that receives a speech packet that contains voice information transmitted from a telephone terminal;

a reception side designating portion that references the joined terminal table, determines a conference that the telephone terminal that has transmitted the speech packet will join, and designates other telephone terminals that will join the conference as the reception side to which the speech packet is transmitted; and a transmitting portion that transmits the speech packet received by the receiving portion to the reception side designated by the reception side designating portion.

When an operation corresponding to at least one of a conference dividing operation, a conference merging operation, and so forth is performed for the joined terminal table corresponding to the joined terminal table operation commanding information, a conference can be divided or merged with another conference. After a conference has been divided or merged with another conference, a telephone terminal that is joining the conference can transmit a speech packet to other telephone terminals that are joining the conference.

(3) A third aspect of the present invention is a telephone exchanging apparatus to which a plurality of telephone terminals are connected, the apparatus including:

a joined terminal table that stores terminal identification information and conference joined information, the terminal identification information identifying a telephone terminal that has an authority for joining a conference, the conference jointed information representing whether or not a telephone terminal is joining the conference;

a receiving portion that receives a speech packet that contains voice information transmitted from a telephone terminal;

a reception side designating portion that designate the reception side of the speech packet received by the receiving portion, the reception side being a telephone terminal that is joining the conference corresponding to the conference joined information stored in the joined terminal table; and a transmitting portion that transmits the speech packet received by the receiving portion to the reception side designated by the reception side designating portion.

The joined terminal table stores terminal identification information and conference joined information, the terminal identification information identifying a telephone terminal that has an authority for joining a conference, the conference jointed information representing whether or not a telephone terminal is joining the conference. A telephone terminal is designated as the reception side corresponding to conference joined information stored in the joined terminal table when the conference joined information represents that the telephone terminal is joining the conference. Thus, speech packets can be transmitted only telephone terminals that are joining the conference corresponding to the terminal identification information stored in the joined terminal table.

(4) A fourth aspect of the present invention is a telephone exchanging apparatus to which a plurality of telephone terminals are connected, the apparatus including:

a joined terminal table that stores terminal identification information and conference organizing authority information, the terminal identification information identifying a telephone terminal that will join a conference, the conference organizing authority information representing an authority for organizing the conference;

a joined terminal table operating portion that operates the joined terminal table corresponding to joined terminal table operation commanding information that causes the joined terminal table to be operated, the joined terminal table operation commanding information being received from a telephone terminal that has an authority for organizing the conference, the conference organizing authority of the telephone terminal being represented by conference organizing authority information being stored in the joined terminal table;

a receiving portion that receives a speech packet that contains voice information transmitted from a telephone terminal; and a transmitting portion that transmits the speech packet received by the receiving portion.

Since only a telephone terminal that has a conference organizing authority can operate the joined terminal table, the telephone terminal can promote the conference without a confusion (namely, assign a conference joining authority to another telephone terminal, terminate a conference, divide a conference, and merge a plurality of conferences).

These and other objects, features and advantages of the present invention will become more apparent in light of the following detailed description of a best mode embodiment thereof, as illustrated in the accompanying drawings.

BRIEF DESCRIPTION OF DRAWINGS

FIG. 5 is a flow chart showing an example of a flow of packets when a conference is started.

FIG. 6 is a schematic diagram showing an example of terminal states shown in a display portion.

FIG. 7 is a schematic diagram showing an example of states of a joined terminal table when a conference is started.

FIG. 8 is a flow chart showing an example of a flow of speech packets in a conference.

FIG. 9 is a flow chart showing another example of a flow of speech packets in a conference.

FIG. 10 is a flow chart showing a flow of packets when an IP telephone terminal that has been joined to a conference is excepted therefrom.

FIGS. 11A and 11B are schematic diagrams showing an example of a joined terminal table before and after an IP telephone terminal that has been joined to a conference is excepted therefrom.

FIG. 12 is a flow chart showing an example of a flow of packets when conferences are merged.

FIGS. 13A and 13B are schematic diagrams showing an example of a joined terminal table before and after conferences are merged.

FIG. 14 is a flow chart showing an example of a flow of packets when a conference is divided.

FIGS. 15A and 15B are schematic diagrams showing an example of a joined terminal table before and after a conference is divided.

FIG. 19 is a schematic diagram showing an example of a joined terminal table that has been rewritten so as to start a conference.

FIG. 20 is a schematic diagram showing an example of a joined terminal table that has been rewritten so that a conference can be started.

DESCRIPTION OF THE EMBODIMENTS

Next, with reference to the accompanying drawings, embodiments of the present invention will be described.

First Embodiment

Figure 1:
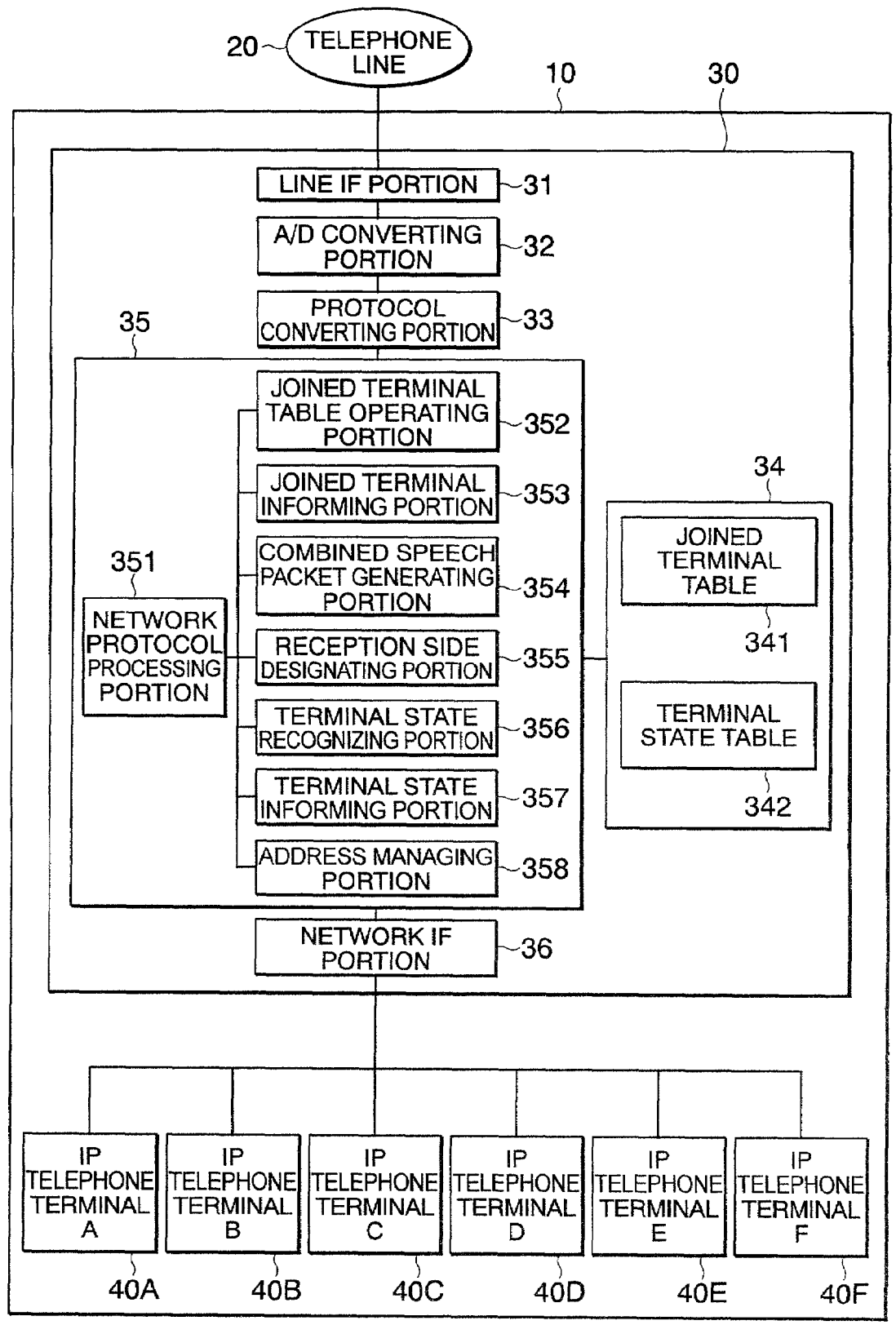
FIG. 1 is a block diagram showing the overall structure of an IP telephone system according to a first embodiment of the present invention.

FIG. 1 is a block diagram showing the overall structure of an Internet protocol (IP) telephone system 10 according to the first embodiment of the present invention. As shown in FIG. 1, a telephone exchanging apparatus 30 connected to a telephone line 20 is connected to IP telephone terminals 40 (40A to 40F). The telephone exchanging apparatus 30, the telephone line 20, and the IP telephone terminals 40 compose a local area network (LAN). In other words, the IP telephone system 10 is accomplished by connecting the telephone exchanging apparatus 30 and the IP telephone terminals 40 as IP terminals assigned respective IP addresses through the LAN.

In the IP telephone system 10, speech packets each of which contains transmission side information, reception side information, and voice information are transmitted and received between the IP telephone terminals 40 and the telephone exchanging apparatus 30 so that the IP telephone terminals 40 can communicate with external telephone terminals connected to the telephone line 20 and other IP telephone terminals 40 connected to the LAN. In addition, the IP telephone system 10 according to the embodiment of the present invention allows a plurality of IP telephone terminals 40 to communicate with each other (namely, the IP telephone terminals 40 to be joined to a conference) as will be described later.

A speech packet contains information of the transmission side and the reception side. Since the IP telephone system 10 does not require that the telephone exchanging apparatus 30 be connected to the IP telephone terminals 40 in one to one relation, the wiring work can be reduced.

The telephone exchanging apparatus 30 controls packets transmitted to and received from the plurality of IP telephone terminals 40 that communicate with each other using speech packets. The telephone exchanging apparatus 30 has two major functions as a private branch exchange (PBX) and a gate keeper. In other words, the telephone exchanging apparatus 30 has a function for exchanging an analog signal of the telephone line 20 and a packet signal of the LAN (this function is referred to as analog—packet signal converting function). The telephone exchanging apparatus 30 operates as a PBX that intermediates between a telephone set disposed outside the LAN through the telephone line 20 and the IP telephone terminal 40 or between the IP telephone terminals 40.

Secondly, the telephone exchanging apparatus 30 operates as a gate keeper that assigns Internet protocol (IP) addresses to the IP telephone terminals 40 and manages the IP address.

The telephone exchanging apparatus 30 comprises a line interface (IF) portion 31, an analog digital (A/D) converting portion 32, a protocol converting portion 33, a storing portion 34, a main controlling portion 35, and a network interface (IF) portion 36.

The line IF portion 31 exchanges an analog signal with the telephone line 20. The A/D converting portion 32 converts an analog signal of the telephone line 20 into a digital signal or vice versa.

The protocol converting portion 33 converts a digital signal converted by the A/D converting portion 32 into a signal corresponding to a protocol of packets transmitted and received in the LAN or vice versa. The aforementioned analog —packet signal converting function is accomplished by a combination of the A/D converting portion 32 and the protocol converting portion 33.

The storing portion 34 stores various types of data. The storing portion 34 is composed of for example a semiconductor memory.

The main controlling portion 35 has a telephone exchanging function and an address managing function. The main controlling portion 35 provides the telephone exchanging apparatus 30 with the function of a PBX and the function of a gate keeper. The details of the storing portion 34 and the main controlling portion 35 will be described later.

The network IF portion 36 exchanges a packet signal with the LAN. In other words, the network IF portion 36 functions as a transmitting portion and a receiving portion that transmits and receives packets, respectively.

(Internal Structure of Main Controlling Portion 35)

Next, the internal structures of the storing portion 34 and the main controlling portion 35 will be described in detail.

The storing portion 34 stores a joined terminal table 341 and a terminal state table 342.

The main controlling portion 35 is composed of a network protocol processing portion 351, a joined terminal table operating portion 352, a joined terminal informing portion 353, a combined speech packet generating portion 354, a reception side designating portion 355, a terminal state recognizing portion 356, a terminal state informing portion 357, and an address managing portion 358.

The joined terminal table 341 stores terminal identification information that identifies an IP telephone terminal 40 that joins a conference along with conference identification information that identifies a conference.

The terminal state table 342 correspondingly stores terminal identification information that identifies each IP telephone terminal 40 and terminal state information that represents the terminal state of each IP telephone terminal 40.

As long as the conference identification information can identify each conference, the conference identification information may be numeric characters, other characters, or a combination thereof. As the terminal identification information stored in the joined terminal table 341 and the terminal state table 342, an extension number, an IP address, or the like of each IP telephone terminal 40 can be used.

The terminal state information has two states "presence" and "absence". The state "presence" represents that the corresponding IP telephone terminal 40 is communicable (namely, the IP telephone terminal 40 is connected to the LAN and is operating). The state "absence" represents that the corresponding IP telephone terminal 40 is incommunicable (namely, the IP telephone terminal 40 is not connected to the LAN or is not operating). In addition, the state "presence" has sub states "speaking", "seating", and "not seating". The sub state "speaking" represents that the corresponding IP telephone terminal 40 is speaking. The sub state "seating" represents that the corresponding IP telephone terminal 40 has been used just before. The sub state "not seating" represents that the corresponding IP telephone terminal 40 has been used for a predetermined time period.

Figures 2A, 2B, 3:
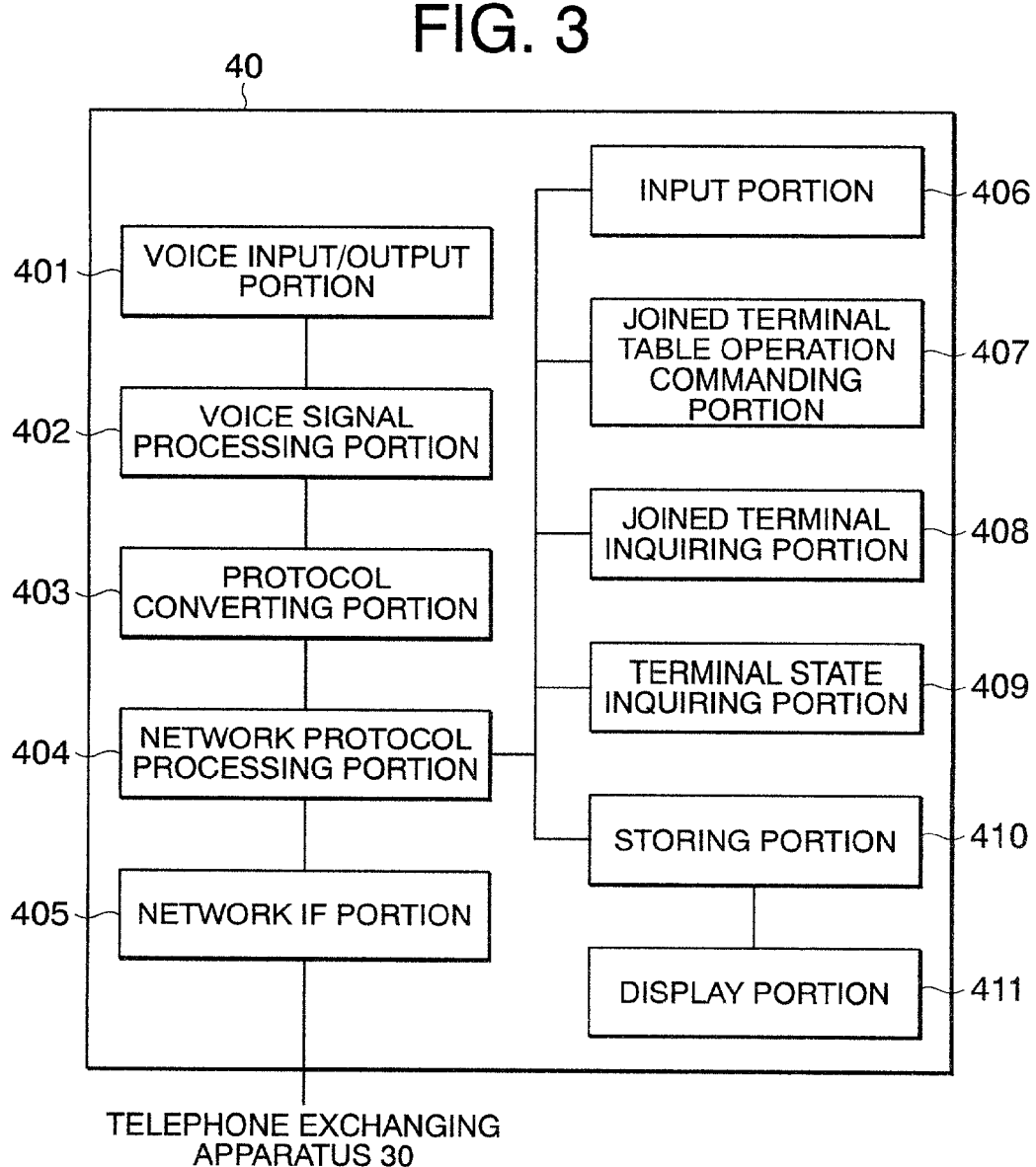
FIGS. 2A and 2B are schematic diagrams showing examples of a joined terminal table and a terminal state table.
FIG. 3 is a block diagram showing the internal structure of an IP telephone terminal.

FIGS. 2A and 2B are schematic diagrams showing examples of the joined terminal table 341 and the terminal state table 342. FIG. 2A correlates conference identification information (groups 1 and 2) and terminal identification information (A to C and D to F). FIG. 2B correlates terminal identification information (A to F) and terminal state information (seating, not seating, and speaking).

The network protocol processing portion 351 is connected to the protocol converting portion 33 and the network IF portion 36. The network protocol processing portion 351 performs a protocol process for packets transmitted and received from and to the IP telephone terminals 40 in the LAN.

The joined terminal table operating portion 352 operates the joined terminal table 341 corresponding to joined terminal table operation commanding information that causes the joined terminal table 341 to be operated. The joined terminal table operating portion 352 can add and except an IP telephone terminal 40 to and from a conference by adding and deleting the terminal identification information to and from the joined terminal table 341. In addition, the joined terminal table operating portion 352 can start, terminate, divide, and merge a conference by operating the joined terminal table 341.

The joined terminal informing portion 353 informs an IP telephone terminal 40 of the terminal state information corresponding to the terminal state table 342 against terminal state inquiring information that inquires the state of an IP telephone terminal 40.

The combined speech packet generating portion 354 generates a combined speech packet of which a plurality of speech packets that contain voice information are combined. Speech packets transmitted from the IP telephone terminals 40 listed in the terminal state table 342 are combined.

However, all speech packets transmitted from the IP telephone terminals 40 listed in the terminal state table 342 are not combined. Instead, speech packets transmitted from at least one IP telephone terminal 40 listed in the terminal state table 342 are excepted from those that are combined.

For example, when IP telephone terminals 40A to 40F are joining a conference, speech packets transmitted from the IP telephone terminals 40B to 40F except for the IP telephone terminal 40A are combined. The combined packet is transmitted to the IP telephone terminal 40A. The IP telephone terminal 40A can receive voice information from the IP telephone terminals 40 that are joining the conference except for voice information of the IP telephone terminal 40A.

As is clear from the example, a combined speech packet should be generated for the reception side to which the combined speech packet is transmitted (namely, a speech packet of the reception side of a combined speech packet is not used to generate the combined speech packet).

The reception side designating portion 355 designates the reception side of a speech packet or a combined speech packet corresponding to the joined terminal table 341. The reception side is designated in such a manner that voice information transmitted from an IP telephone terminal 40 is not returned to the same IP telephone terminal 40.

The terminal state recognizing portion 356 recognizes the state of an IP telephone terminal 40 and updates (rewrites) the terminal state table 342 corresponding to the recognized state.

The terminal state informing portion 357 informs an IP telephone terminal 40 of terminal state information stored in the terminal state table 342 corresponding to terminal state inquiring information that inquires the state of an IP telephone terminal 40.

The address managing portion 358 manages the aforementioned addresses. In other words, the address managing portion 358 correlates telephone numbers as identification information pre-assigned to the IP telephone terminals 40, media access control (MAC) addresses as fixed network addresses, and IP addresses as variable network addresses assigned to the IP telephone terminals 40 when they are started, and the address managing portion 358 manages these addresses. The IP addresses can be assigned corresponding to dynamic host configuration protocol (DHCP).

Although the internal structure of the telephone exchanging apparatus 30 has been described, the address managing portion 358 may not be disposed in the telephone exchanging apparatus 30. In this case, the address managing portion 358 may be disposed in a gate keeper. In other words, the function of the private branch exchange and the function of the gate keeper may be disposed as independent units if necessary.

(Internal Structure of IP Telephone Terminal 40)

FIG. 3 is a block diagram showing the internal structure of each IP telephone terminal 40. As shown in FIG. 3, each IP telephone terminal 40 is composed of a voice input/output portion 401, a voice signal processing portion 402, a protocol converting portion 403, a network protocol processing portion 404, a network IF (interface) portion 405, an input portion 406, a joined terminal table operation commanding portion 407, a joined terminal inquiring portion 408, a terminal state inquiring portion 409, a storing portion 410, and a display portion 411.

The voice input/output portion 401 is a handset provided with for example a microphone and a speaker. With the voice input/output portion 401, the user can communicate with another user.

The voice signal processing portion 402 exchanges a voice signal with the voice input/output portion 401 and converts the voice signal as an analog signal into a digital signal.

The protocol converting portion 403 converts the digital voice signal into a signal corresponding to a protocol of a packet that is transmitted and received in the LAN and vice versa. In other words, the protocol converting portion 403 functions as a speech packet generating portion that generates a speech packet that contains voice information.

The network protocol processing portion 404 performs a protocol process for a packet transmitted and received by the network IF portion 405. In other words, the network IF portion 405 functions as a transmitting unit and a receiving unit for packets. When the IP telephone terminal 40 exchanges information through the LAN, the information is exchanged through the network IF portion 405 and the network protocol processing portion 404.

The input portion 406, for example a ten key, allows a message containing character information to be input. The input portion 406 may be provided with a hook of a handset.

The IP telephone terminal 40 may not be always provided with the input portion 406. For example, the input portion 406 may be a keyboard of a personal computer (PC) connected to the IP telephone terminal 40.

The joined terminal table operation commanding portion 407 generates joined terminal table operation commanding information that causes the joined terminal table 341 to be operated corresponding to input data of the input portion 406.

The joined terminal inquiring portion 408 generates joined terminal inquiring information that inquires an IP telephone terminal 40 that joins a conference corresponding to input data of the input portion 406.

The terminal state inquiring portion 409 generates terminal state inquiring information that inquires the state (terminal state) of the IP telephone terminal 40 corresponding to input data of the input portion 406.

The storing portion 410 stores terminal identification information and terminal state information of an IP telephone terminal 40 that joins a conference against the joined terminal inquiring information and the terminal state inquiring information. The storing portion 410 is composed of for example a semiconductor memory.

The display portion 411 is a display unit such as a liquid crystal display (LCD). The display portion 411 displays terminal identification information, terminal state information, and so forth stored in the storing portion 410. It is not always necessary to provide the IP telephone terminal 40 with the display portion 411. For example, a display portion of a personal computer (PC) connected to the IP telephone terminal 40 may be used.

(Recognizing Process of Terminal State by Terminal State Recognizing Portion 356)

Figure 4:
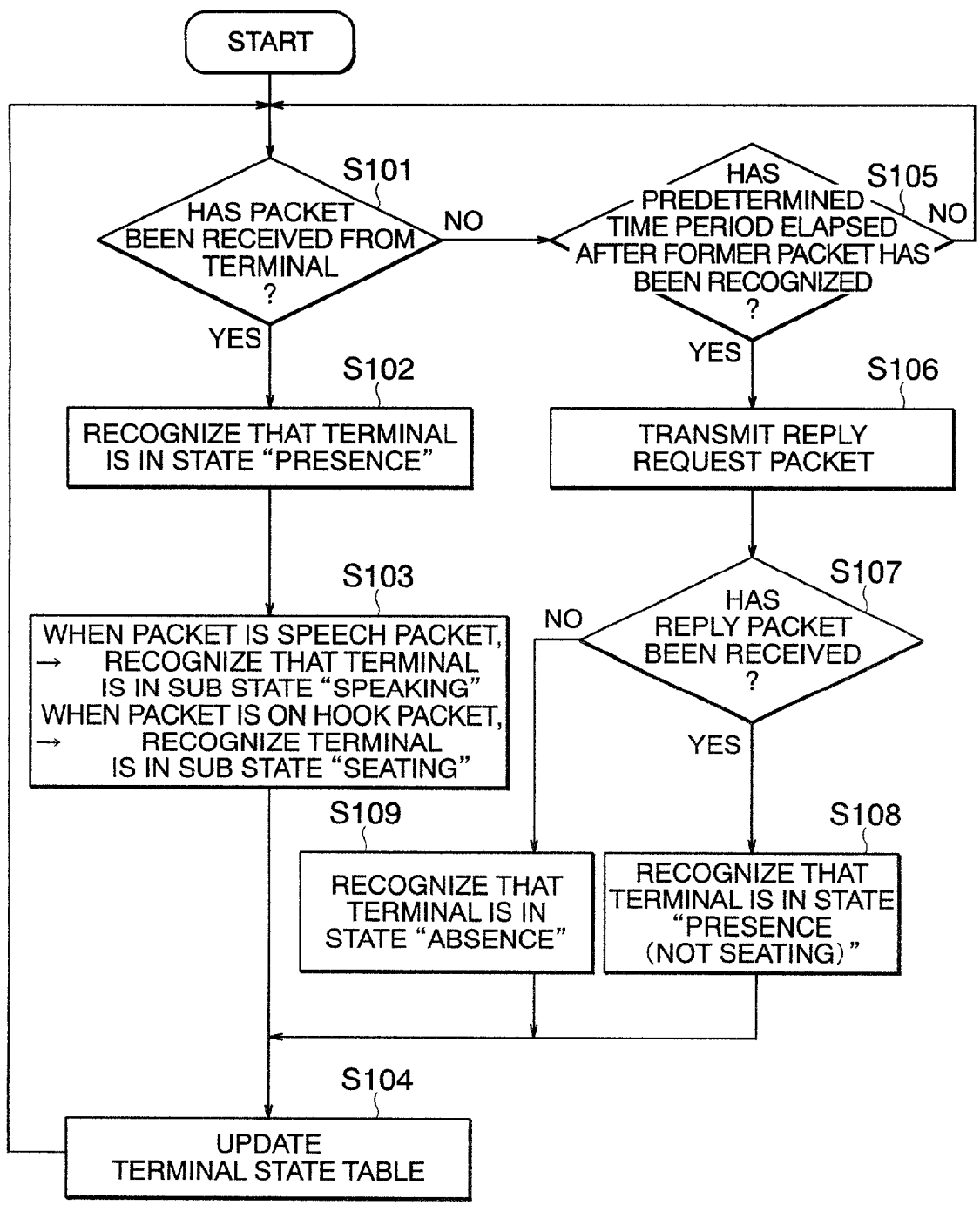
FIG. 4 is a flow chart showing a recognizing process of a terminal state by a terminal state recognizing portion.

FIG. 4 is a flow chart showing a recognizing process of the terminal state by the terminal state recognizing portion 356. Next, with reference to FIG. 4, the recognizing process performed by the terminal state recognizing portion 356 will be described in detail. In the following description, it is assumed that the terminal state table 342 is updated as the terminal state of each IP telephone terminal 40 varies.

(1) It is always determined whether or not the telephone exchanging apparatus 30 has received a packet from an IP telephone terminal 40 (at step S101).

Corresponding to the IP address of the transmission side of the received packet, the terminal state recognizing portion 356 recognizes that the IP telephone terminal 40 that has transmitted the packet is "present" (at step S102).

(2) Depending on the type of the received packet, one of the following states is recognized (at step S103).

1) When the received packet is a speech packet that contains a voice, the terminal state recognizing portion 356 recognizes that the IP telephone terminal 40 is in the state "speaking".

2) When the received packet is an on-hook packet that represents that the handset has been returned to the telephone set (namely, the speech has been completed), the terminal state recognizing portion 356 recognizes that the IP telephone terminal 40 is in the sub state "seating" (changed from the sub state "speaking" to the sub state "seating").

(3) Corresponding to the recognized result, the terminal state table 342 is updated (at step S104). In other words, the terminal state table 342 is rewritten.

(4) When the determined result at step S101 is "No", it is determined whether or not a predetermined time period has elapsed after the telephone exchanging apparatus 30 had recognized the terminal state (at step S105).

When the determined result at step S105 is "Yes", a reply request packet that requests a reply is transmitted to the IP telephone terminal 40 (at step S106). Thereafter, it is determined whether or not a replay packet replied against the reply request packet has been received in a predetermined time period after the reply request packet had been transmitted (at step S107).

(5) When the determined result at step S107 is "Yes", the terminal state recognizing portion 356 recognizes that the IP telephone terminal 40 is in the state "presence" (at step S108). When the determined result at step S107 is "No", the terminal state recognizing portion 356 recognizes that the IP telephone terminal 40 is in the state "absence" (at step S109).

When the terminal state recognizing portion 356 has recognized at step S107 that the IP telephone terminal 40 is in the "presence", since a packet has not been received from the IP telephone terminal 40 for at least the predetermined time period designated at step S105, the terminal state recognizing portion 356 recognizes that the IP telephone terminal 40 is in the sub state "not seating".

(6) Thereafter, the terminal state table 342 is updated (at step S104). The state "absence" may be recognized only when a reply has not been received against a plurality of reply request packets transmitted at predetermined intervals.

When the determined result at step S105 is "No", the flow returns to step S101. At step S101, it is determined whether or not a packet has been transmitted from the IP telephone terminal 40.

(Operations of IP Telephone System 10)

In the IP telephone system 10 according to the embodiment, when the joined terminal table 341 is operated, the start and termination of a conference and the addition, exception, change, and so forth of an IP telephone terminal 40 that joins a conference can be easily performed.

Next, these operations will be described in succession.

A. Start of Conference

FIG. 5 is a flow chart showing an example of a flow of packets when a conference is started.

(1) A terminal state inquiring packet that inquires the terminal state of the IP telephone terminal 40 is transmitted from one IP telephone terminal 40 to the telephone exchanging apparatus 30 (at step S21). In this example, it is assumed that the terminal state inquiring packet is transmitted from the IP telephone terminal 40A.

The terminal state inquiring packet contains terminal state inquiring information that inquires the state (terminal state) of the IP telephone terminal 40. The terminal state inquiring information is generated by the terminal state inquiring portion 409 corresponding to input data of the input portion 406.

(2) The telephone exchanging apparatus 30 transmits a terminal state informing packet to the IP telephone terminal 40 that has transmitted the terminal state inquiring packet corresponding to the terminal state inquiring information (at step S22).

When the IP telephone terminal 40 receives the terminal state informing packet, the IP telephone terminal 40 displays the terminal state information on the display portion 411.

FIG. 6 shows an example of terminal states displayed on the display portion 411. FIG. 6 correlates IP telephone terminals 40 and their terminal states.

(3) Conference start information that represents the start of a conference and terminal identification information that identifies an IP telephone terminal 40 that joins the conference are input from the input portion 406 of the IP telephone terminal 40 whose terminal state has been displayed. When necessary, conference identification information that identifies the conference is input. The telephone exchanging apparatus 30 may assign conference identification information to a conference so that it does not overlap with exiting conferences without need to input it with the IP telephone terminal 40.

Information that represents the start of a conference that for example the IP telephone terminals 40A, 40B, and 40C join is input.

Corresponding to the input conference start information and so forth, the joined terminal table operation commanding portion 407 generates joined terminal table operation commanding information with which the joined terminal table operating portion 352 operates the joined terminal table 341. The generated joined terminal table operation commanding information is transmitted as a joined terminal table operation commanding packet from the IP telephone terminal 40 to the telephone exchanging apparatus 30 (at step S23).

After the telephone exchanging apparatus 30 has received the joined terminal table operation commanding packet, the telephone exchanging apparatus 30 causes the joined terminal table operating portion 352 to operate the joined terminal table 341.

FIG. 7 is a schematic diagram showing an example of a state of the joined terminal table 341 when a conference is started by operating the joined terminal table operating portion 352. This example shows a conference that IP telephone terminals A (40A), B (40B), and F (40F) join.

(4) After the telephone exchanging apparatus 30 has operated the joined terminal table 341, the telephone exchanging apparatus 30 transmits to the IP telephone terminals 40 joining inquiring packets that inquire that they will join the conference (at step S24). The inquiring packets are transmitted to all the IP telephone terminals 40 that will join the conference except for the IP telephone terminal 40 that has transmitted the joined terminal operation commanding packet.

Joining confirming packets as replies against the joining inquiring packets are transmitted from the IP telephone terminals 40 to the telephone exchanging apparatus 30. When the telephone exchanging apparatus 30 receives the joining confirming packets (at steps S25b and S25f), the conference is started.

Next, the flow of speech packets in a conference will be described.

FIG. 8 is a flow chart showing an example of speech packets in a conference. In this example, it is assumed that IP telephone terminals A (40A), B (40B), and F (40F) join a conference.

(1) Speech packets A1, B1, and F1 that contain voice information are transmitted from IP telephone terminals 40 to the telephone exchanging apparatus 30 (at steps S1a, S1b, and S1f). In this example, it is assumed that the speech packets A1, B1, and F1 are transmitted and received almost at a time.

(2) A combined speech packet of which the speech packets A1, B1, and F1 have been combined is transmitted from the telephone exchanging apparatus 30 to the IP telephone terminals 40 that join the conference (at steps S2a, S2b, and S2f).

The combined speech packet is generated by the combined speech packet generating portion 354. The address of the reception side is designated by the reception side designating portion 355.

A combined speech packet is generated by combining speech packets of IP telephone terminals 40 except for an IP telephone terminal 40 of the reception side. This is because when the voice information contained in the speech packet transmitted from the IP telephone terminal 40 of the transmission side is returned thereto, a kind of echo or howling takes place.

In the example, the combined speech packet of which speech packets B1 and F1 transmitted from the IP telephone terminals B (40B) and F (40F) have been combined is transmitted to the IP telephone terminal A (40A). The combined speech packet of which speech packets A1 and F1 transmitted from the IP telephone terminals A (40A) and F (40F) have been combined is transmitted to the IP telephone terminal B (40B). The combined speech packet of which speech packets A1 and B1 transmitted from the IP telephone terminals A (40A) and B (40B) have been combined is transmitted to the IP telephone terminal F (40F).

In such a manner, each IP telephone terminal 40 (local IP telephone terminal 40) can receive voice information of other IP telephone terminals 40 that join the conference except for voice information of the local IP telephone terminal 40.

A combined packet may be generated by combining voice information contained in a plurality of speech packets. For example, voice information contained in a speech packet may be returned to a voice signal. The voice signals may be combined in a voice signal level. Alternatively, speech packets may be combined in the unit of cells. Since a speech packet may have an empty cell that does not contain voice information, cells that contain voice information may be placed in empty cells. In such a manner, a speech packet can be combined in the unit of cells.

(3) Likewise, speech packets almost simultaneously received by the telephone exchanging apparatus 30 are combined and transmitted to each IP telephone terminal 40 that joins the conference (at step S3a to S6f).

FIG. 9 is a flow chart showing another example of a flow of speech packets in a conference. In this example, speech packets are not combined, but they are transmitted to each IP telephone terminal 40.

As with the aforementioned example, the reception side designating portion 355 designates the reception side of speech packets so that a speech packet transmitted from each IP telephone terminal 40 is not returned thereto. In this example, since speech packets are not combined, the combined speech packet generating portion 354 is not required.

B. Exception of IP Telephone Terminal 40 from Conference

FIG. 10 is a flow chart showing a flow of packets when an IP telephone terminal 40 is excepted from a conference according to the embodiment of the present invention.

(1) A terminal state inquiring packet that inquires the state of an IP telephone terminal 40 that joins a conference is transmitted from an IP telephone terminal A (40A) to the telephone exchanging apparatus 30 (at step S31). The telephone exchanging apparatus 30 transmits a terminal state informing packet that represents the terminal state to the IP telephone terminal A (40A) (at step S32). The terminal state is displayed on the display portion 411.

(2) Terminal excepting information that causes an IP telephone terminal 40 to be excepted from a conference and terminal identification information that identifies the IP telephone terminal B (40B) excepted from the conference are input to the input portion 406 of the IP telephone terminal A (40A). When a plurality of conferences are being held, conference identification information that identifies a conference is also input.

Corresponding to the terminal excepting information that has been input, the joined terminal table operation commanding portion 407 generates joined terminal table operation commanding information with which the joined terminal table operation commanding portion 407 operates the joined terminal table. The generated joined terminal table operation commanding information is transmitted as a joined terminal table operation commanding packet from the IP telephone terminal 40 to the telephone exchanging apparatus 30 (at step S33). In this example, since the joined terminal table operation commanding packet contains the terminal excepting information, the joined terminal table operation commanding packet functions as a terminal exception commanding packet.

After the telephone exchanging apparatus 30 has received the joined terminal table operation commanding packet, the telephone exchanging apparatus 30 causes the joined terminal table operating portion 352 to operate the joined terminal table 341.

As a result, for instance, the joined terminal table 341 shown in FIG. 11A is rewritten as shown in FIG. 11B. Information of speech packets that have been transmitted from the IP telephone terminals A (40A) and B (40B) is not transmitted to the IP telephone terminal F (40F). In contrast, information of a speech packet that has been transmitted from the IP telephone terminal F (40F) is transmitted to the IP telephone terminals A (40A) and B (40B).

C. Termination of Conference

When an IP telephone terminal 40 transmits a joined terminal table operation commanding packet that contains conference terminating information to the telephone exchanging apparatus 30, a conference can be terminated. When a plurality of conferences are being held, conference identification information that identifies a conference is contained in the joined terminal table operation commanding packet.

Alternatively, when a conference is terminated, the joined terminal table operation commanding packet (terminal exception commanding packet) transmitted at step S33 shown in FIG. 10 can be used. In other words, when all IP telephone terminals 40 joined in a conference or all of them except for one IP telephone terminal 40 are excepted from the conference, the conference can be terminated.

D. Merging of Conferences

Next, a process for merging a plurality of conferences to one conference will be described.

FIG. 12 is a flow chart showing an example of a flow of packets when conferences are merged to one conference according to the embodiment of the present invention.

(1) A joined terminal inquiring packet that inquires an IP telephone terminal 40 that will join a conference is transmitted form an IP telephone terminal A (40A) to the telephone exchanging apparatus 30 (at step S41).

The joined terminal inquiring packet contains joined terminal inquiring information that inquires an IP telephone terminal 40 that will join a conference. The joined terminal inquiring information is generated by the joined terminal inquiring portion 408 corresponding to input data of the input portion 406.

(2) Corresponding to the joined terminal inquiring information, the telephone exchanging apparatus 30 transmits a joined terminal informing packet that informs of joined terminal information that represents an IP telephone terminal 40 that will join a conference corresponding to the joined terminal table 341 the IP telephone terminal 40 of the transmission side that has transmitted the joined terminal inquiring packet (at step S42).

The IP telephone terminal 40 that has received the joined terminal informing packet can display the joined terminal information on the display portion 411.

FIGS. 13A and 13B show examples of the joined terminal table before and after conferences are merged. FIGS. 13A and 13B show IP telephone terminals 40 that join conferences that pre-merged conferences and post-merged conference. As shown in FIG. 13A, before the conferences are merged, IP telephone terminals A to C (40A to 40C) join a conference of group 1, whereas IP telephone terminals D to F (40D to 40F) join a conference of group 2. As shown in FIG. 13B, after the conferences have been merged, the IP telephone terminals A to F (40A to 40F) join a conference of group 3.

(3) Corresponding to input information of the input portion 406, a joined terminal table operation commanding packet (conference merging commanding packet) that contains conference merging information that represents that conferences will be merged and conference identification information that identifies conferences to be merged is generated. The generated conference merging commanding packet is transmitted from the IP telephone terminal A (40A) to the telephone exchanging apparatus (at step S43).

When the telephone exchanging apparatus 30 has received the joined terminal table operation commanding packet, the telephone exchanging apparatus 30 causes the joined terminal table operating portion 352 to operate the joined terminal table 341 so as to rewrite the joined terminal table 341 as shown in FIGS. 13A and 13B.

E. Dividing of Conference

Next, a process for dividing one conference into a plurality of conferences will be described.

FIG. 14 is a flow chart showing an example of a flow of packets when one conference is divided into a plurality of conferences according to the embodiment of the present invention.

The dividing process shown in FIG. 14 is almost the same as the merging process shown in FIG. 12. However, in FIG. 14, the joined terminal table operation commanding packet transmitted at step S43 means a conference dividing commanding packet. The conference dividing commanding packet contains conference dividing commanding information that causes a conference to be divided and terminal identification information that identifies IP telephone terminals 40 that join each of the divided conferences.

When the telephone exchanging apparatus 30 receives the joined terminal table operation commanding packet, the telephone exchanging apparatus 30 causes the joined terminal table operating portion 352 to operate the joined terminal table 341. As a result, as shown in FIGS. 15A and 15B, the joined terminal table is rewritten so that one conference is divided into a plurality of conferences. In other words, information of speech packets can be handled, combined, and transmitted for each conference without a possibility of which they are mingled.

Second Embodiment

Next, a second embodiment of the present invention will be described.

Figure 16:
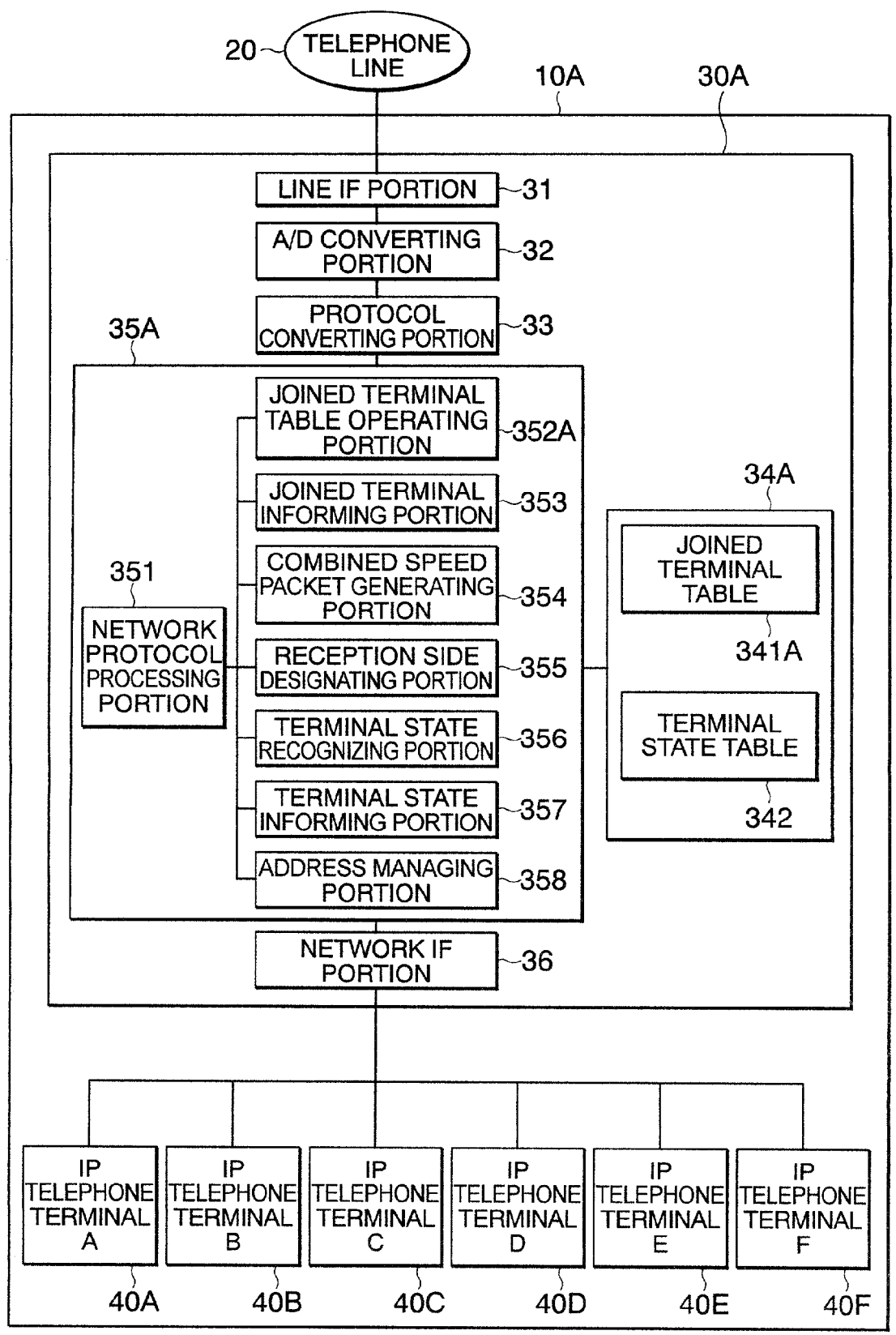
FIG. 16 is a block diagram showing the overall structure of an IP telephone system according to a second embodiment of the present invention.

FIG. 16 is a block diagram showing the structure of an IP telephone system 10A according to the second embodiment of the present invention. The IP telephone system 10A has a telephone exchanging apparatus 30A containing a storing portion 34A and a main controlling portion 35A. The storing portion 34A has a joined terminal table, and the main controlling portion 35A has a joined terminal table operating portion 352A. The joined terminal table 341A and the joined terminal table operating portion 352A correspond to the joined terminal table 341 and the joined terminal table operating portion 352 according to the first embodiment, respectively. However, as will be described later, data stored in the joined terminal table 341a differs from data stored in the joined terminal table 341. Except this point, the structure of the IP telephone system 10A is almost similar to the structure of the IP telephone system 10 shown in FIG. 1 according to the first embodiment of the present invention.

Figures 17, 18:
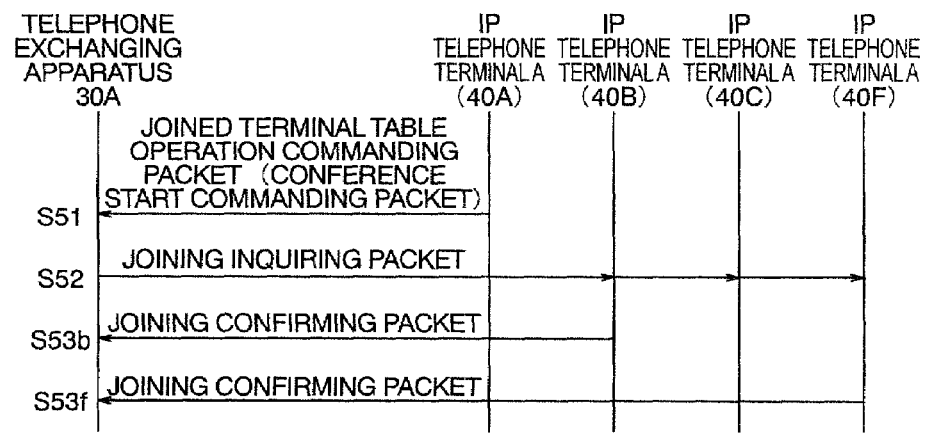
FIG. 17 is a schematic diagram showing an example of a joined terminal table of the IP telephone system according to the second embodiment of the present invention.
FIG. 18 is a flow chart showing an example of a flow of packets when a conference is started.

FIG. 17 is a schematic diagram showing an example of data stored in the joined terminal table 341A. As shown in FIG. 17, the joined terminal table 341A correlates terminal identification information, conference identification information, conference joining information, and conference organizing authorizing information.

As with the first embodiment, the conference identification information is identification information that identifies a conference.

The terminal identification information is information that identifies an IP telephone terminal 40 that has an authority necessary for joining a conference. The terminal identification information according to the second embodiment does not directly represent an IP telephone terminal 40 itself that joins a conference. Thus, the terminal identification information according to the second embodiment is different from the terminal identification information according to the first embodiment. In other words, although an IP telephone terminal 40 represented with the terminal identification information has an authority necessary for joining a conference, the IP telephone terminal 40 is not always joining the conference.

The conference joining information is information that represents whether or not an IP telephone terminal 40 is joining a conference. Speech packets of IP telephone terminals 40 that are joining a conference are transmitted to an IP telephone terminal 40 whose conference joining information is "joining".

The conference organizing authorizing information is information that represents whether or not an IP telephone terminal 40 has an authority for organizing a conference. When the organizing authorizing information of an IP telephone terminal 40 is "presence of authority for organizing a conference", the IP telephone terminal 40 can rewrite the joined terminal table 341A with respect to the conference.

As with as the first embodiment, as long as the conference identification information and so forth can identify a conference, they can be composed of numeric characters, any other characters, and a combination thereof. Likewise, the terminal identification information may be an extension number, an IP address, or the like of each IP telephone terminal 40.

(Operations of IP Telephone System 10A)

In the IP telephone system 10A according to the second embodiment, when the joined terminal table 341A is operated, the start and termination of a conference and the addition, exception, change, and so forth of an IP telephone terminal 40 that joins a conference can be easily performed.

Next, these operations will be described in succession.

A. Start of Conference

FIG. 18 is a flow chart showing an example of a flow of packets when a conference is started according to the second embodiment of the present invention.

(1) A joined terminal table operation commanding packet is transmitted from an IP telephone terminal 40 to the telephone exchanging apparatus 30A (at step S51).

Step S51 shown in FIG. 18 corresponds to step S23 shown in FIG. 5. Before step S51, a terminal state inquiring packet and a terminal state informing packet at steps S21 and S22 shown in FIG. 5 may be transmitted and received.

The transmission of the joined terminal table operation commanding packet means the organization of a conference (calling of IP telephone terminals 40 to a conference). As will be described later, an IP telephone terminal 40 that has transmitted the joined terminal table operation commanding packet has an organizing authority as a conference organizer. An IP telephone terminal 40 as a conference organizer has authorities for assigning a conference joining authority to an IP telephone terminal 40, terminating a conference, merging conferences, dividing a conference, and so forth. The assignment of a joining authority, the termination of a conference, the merging of conferences, and the division of a conference are performed by operating the joined terminal table 341A. Thus, it can be said that an IP telephone terminal 40 that has an authority for organizing a conference has an authority for operating the joined terminal table 341A.

Conference start information that represents that a conference will be started and terminal identification information that identifies an IP telephone terminal 40 that has an authority for joining a conference are input by the input portion 406 of the IP telephone terminal 40A. At that point, when necessary, conference identification information that identifies a conference is input. The telephone exchanging apparatus 30A may properly and uniquely assign conference identification information to each conference so that the same conference identification information is not assigned to a plurality of conferences.

For example, information that represents the start of a conference that the IP telephone terminals 40A, 40B, 40C, and 40F will join is input. In other words, a conference joining authority is assigned to the IP telephone terminals 40A, 40B, 40C, and 40F.

When the telephone exchanging apparatus 30A has received the joined terminal table operation commanding packet, the telephone exchanging apparatus 30A causes the joined terminal table operating portion 352A to operate the joined terminal table 341A.

FIG. 19 is a schematic diagram showing an example of data of the joined terminal table 341A that has been rewritten by the joined terminal table operating portion 352A so that a conference is started.

In the example, an authority for joining a conference has been assigned to the IP telephone terminals A (40A), B (40B), C (40C), and F (40F). In addition, an authority for promoting a conference has been assigned to the IP telephone terminal A (40A) that has organized the conference.

At that point, only the IP telephone terminal A (40A) is joining the conference. When the IP telephone terminal A (40A) has the authority for promoting the conference, the IP telephone terminal 40 A (40) automatically joins the conference. However, in this state, since only the IP telephone terminal A (40A) is joining the conference, it is not started.

When the IP telephone terminals B (40B), C (40C), and F (40F) transmit respective joining confirming packets to the telephone exchanging apparatus 30A, they can join the conference.

(2) After the telephone exchanging apparatus 30A has operated the joined terminal table 341A, the telephone exchanging apparatus 30A transmits joining inquiring packets to the IP telephone terminals 40 (at step S52). The inquiring packets are transmitted to the IP telephone terminals 40 that will join the conference except for the IP telephone terminal 40 that has transmitted the joined terminal operation commanding packet.

Confirming packets that represent confirmations against the joining inquiring packets are transmitted from the IP telephone terminals 40 to the telephone exchanging apparatus 30A (at steps S53b and S53f).

Whenever the telephone exchanging apparatus 30A receives a confirming packet, the joined terminal table operating portion 352A rewrites the joined terminal table 341A.

FIG. 20 is a schematic diagram showing an example of the joined terminal table 341A that has been written so that a conference can be started. At steps S53b and S53f, confirming packets are transmitted from the IP telephone terminals B (40B) and F (40F). Thus, the joining information of the IP telephone terminals B (40B) and F (40F) has been rewritten from "not joining" to "joining".

When a confirming packet transmitted from an IP telephone terminals 40 is received by the telephone exchanging apparatus 30A, the conference is started. In other words, a conference is started without need to check whether or not confirming packets have been received from all IP telephone terminals 40 (in this example, the IP telephone terminals B (40B), C (40C), and F (40F)) to which joining authorities have been assigned. Thus, a conference can be started by a part of IP telephone terminals 40 that will join the conference.

When the telephone exchanging apparatus 30A receives a confirming packet from an IP telephone terminal 40, it can join the conference. In other words, as an IP telephone terminal 40 transmits a confirming packet to the telephone exchanging apparatus 30A with a delay, the IP telephone terminal 40 will join the conference with a delay.

Speech packets (or a combined speech packet) of IP telephone terminals 40 that are joining a conference are transmitted from the telephone exchanging apparatus 30A to each IP telephone terminal 40 that is joining the conference. In other words, information of the conference (namely, speech packets) is transmitted to IP telephone terminals 40 that are "joining" in the joined terminal table 341, not IP telephone terminals 40 that are "not joining" in the joined terminal table 341.

Since the flow of speech packets in a conference according to the second embodiment does not largely differ from that of the first embodiment, the description thereof will be omitted.

B. Exception of IP Telephone Terminal 40 from Conference

As with the first embodiment, according to the second embodiment of the present invention, when a joined terminal table operation commanding packet that contains terminal excepting information is transmitted from an IP telephone terminal 40 to the telephone exchanging apparatus 30A, another IP telephone terminal 40 that is joining the conference can be excepted from the joined terminal table 341A.

In this example, only an IP telephone terminal 40 that has an authority for organizing a conference can transmit a joined terminal table operation commanding packet (so as to operate the joined terminal table 341A). When the telephone exchanging apparatus 30A receives the joined terminal table operation commanding packet, the telephone exchanging apparatus 30A references the joined terminal table 341A and determines whether or not the IP telephone terminal 40 that has transmitted the joined terminal table operation commanding packet has an authority for organizing a conference.

When the IP telephone terminal 40 that has transmitted the joined terminal table operation commanding packet has an authority for organizing a conference, the joined terminal table operating portion 352A operates the joined terminal table 341. When the IP telephone terminal 40 that has transmitted the joined terminal table operation commanding packet does not have an authority for organizing a conference, the joined terminal table operating portion 352A does not operate the joined terminal table 341.

When necessary, if an authority is violated (namely, an IP telephone terminal 40 that does not has a proper authority has transmitted a joined terminal table operation commanding packet), a warning may be issued to the IP telephone terminal 40. For example, this warning is issued by transmitting to the IP telephone terminal 40 that has transmitted the joined terminal table operation commanding packet a packet that contains a message that informs the IP telephone terminal of the absence of authority. Alternatively, packets that contains a warning message may be transmitted to an IP telephone terminal 40 that has an authority for organizing a conference or all IP telephone terminals 40 that are joining the conference.

When the joined terminal table 341A is rewritten, speech packets of IP telephone terminals 40 that are joining the conference are not transmitted to an IP telephone terminal 40 that has been excepted from the conference. In addition, a speech packet of the IP telephone terminal 40 that has been excepted from the conference is not transmitted to the other IP telephone terminals 40 that are joining the conference.

Since the other points of this operation according to the second embodiment are almost the same as those according to the first embodiment, their description will be omitted.

C. Termination of Conference

When a joined terminal table operation commanding packet that contains conference terminating information that causes a conference to be terminated is transmitted from an IP telephone terminal 40 that has an authority for organizing a conference to the telephone exchanging apparatus 30A, the conference can be terminated.

As with the case that an IP telephone terminal 40 is excepted from a conference, the telephone exchanging apparatus 30A references the joined terminal table 341A and determines whether or not an IP telephone terminal 40 that has transmitted a joined terminal table operation commanding packet has an authority for organizing a conference.

D. Merging of Conferences

When a joined terminal table operation commanding packet that contains conference merging information that causes conferences to be merged and conference identification information that identifies conferences to be merged is transmitted from an IP telephone terminal 40 that has an authority for organizing a conference to the telephone exchanging apparatus 30A, the conferences can be merged (1) Checking for Validity of Merging Conferences When a plurality of conferences are merged, authorities for organizing conferences may conflict. In other words, there is a possibility of which an organizer of one conference should operate a joined terminal table 341A with respect to another conference for which the organizer does not have an authority. Thus, an authority for operating the joined terminal table 341A in the case that conferences are merged should be differ from that in the other cases.

When an IP telephone terminal 40 that has an authority for organizing a conference is assigned an authority for operating the joined terminal table 341A for the other conference with regard to merging of conferences, the IP telephone terminal 40 can merge the conferences. However, when the IP telephone terminal 40 is unconditionally assigned the authority for operating the joined terminal table 341A for the other conference, there is a possibility of which conferences are improperly merged. Thus, it is preferred to have IP telephone terminals 40 that have authorities for organizing conferences agree with the merging of the conferences in advance.

In other words, when a plurality of conferences organized by different IP telephone terminals 40 having respective authorities for organizing conferences are merged, they should discuss the merging of the conferences and designate an organizer of the merged conference.

This discussion can be performed by the IP telephone terminals 40 or another communicating unit. When the discussion is performed by the IP telephone terminals 40, regular speech packets other than those for conferences can be used. As a result, the conversations of the IP telephone terminals 40 that have authorities for organizing conferences can be prevented from being leaked to the other IP telephone terminals 40. Alternatively, to prevent these conversations from being leaked to the other IP telephone terminals 40, the concerned IP telephone terminals 40 may be temporarily placed in the state "not joining".

(2) Transmission of Joined Terminal Table Operation Commanding Packet

After the concerned IP telephone terminals 40 agreed with the merging of conferences and the organizer of the merged conference, one of the IP telephone terminals 40 that organize the conferences to be merged transmits a joined terminal table operation commanding packet that contains conference merging information that represents that the conferences will be merged, conference identification information that represents conferences to be merged, and terminal identification information that identifies an IP telephone terminal 40 that has an authority for organizing the merged conference.

When an agreement is existing, in the agreement an IP telephone terminal 40 that has an authority for organizing a merged conference transmits a joined terminal table operation commanding packet, it is not necessary to cause the joined terminal table operation commanding packet to contain the terminal identification information that identifies the IP telephone terminal 40 that has the authority for organizing the merged conference.

An IP telephone terminal 40 that has an authority for organizing a conference to be merged with another conference and that does not have an authority for organizing the merged conference (namely, an IP telephone terminal 40 that does not transmit a joined terminal table operation commanding packet) may transmit a merged conference agreement packet that represents that the IP telephone terminal 40 has agreed with the merging of the conferences to the telephone exchanging apparatus 30A. In this case, a situation of which conferences are mistakenly merged can be prevented.

(3) Checking for Authority for Organizing Conference

After the telephone exchanging apparatus 30A has received the joined terminal table operation commanding packet, the telephone exchanging apparatus 30A references the joined terminal table 341A and checks whether or not an IP telephone terminal 40 that has transmitted the joined terminal table operation commanding packet has an authority for organizing a conference.

When an agreement is existing, in the agreement an IP telephone terminal 40 that has an authority for organizing a conference to be merged with another conference and that does not have an authority for organizing the merged conference transmits a merged conference agreement packet to the telephone exchanging apparatus 30A, the telephone exchanging apparatus 30A checks whether or not the merged conference agreement packet has been received from the IP telephone terminal 40, too.

(4) Operation of Joined Terminal Table

After having checked that the IP telephone terminal 40 that has transmitted the joined terminal table operation commanding packet has the authority for organizing the combined conference, the joined terminal table operating portion 352A of the telephone exchanging apparatus 30A rewrites the joined terminal table 341A.

E. Dividing of Conference

When an IP telephone terminal 40 that has an authority for organizing a conference transmits a joined terminal table operation commanding packet that contains conference dividing information that represents that a conference will be divided is transmitted to the telephone exchanging apparatus 30A, a conference can be divided At that point, the joined terminal table operation table commanding packet contains conference dividing commanding information that causes a conference to be divided, terminal identification information that represents IP telephone terminals 40 that will join each of divided conferences, and terminal identification information that identifies IP telephone terminals 40 that will have authorities for organizing the divided conferences.

After the joined terminal table operating portion 352A of the telephone exchanging apparatus 30A has received the joined terminal table operation commanding packet, the joined terminal table operating portion 352A rewrites the joined terminal table 341A and divides the conference. At that point, the IP telephone terminals 40 that have authorities for organizing respective conferences can operate the joined terminal table 341A within their authorities. In other words, each IP telephone terminal 40 that has an authority for organizing a conference cannot operate the joined terminal table 341A for the other conferences.

Since other points of this operation according to the second embodiment are almost the same as those according to the first embodiment, their description will be omitted.

F. Transferring of Authority for Organizing Conference

An IP telephone terminal 40 that has an authority for organizing a conference can transfer the authority to another IP telephone terminal 40. The IP telephone terminal 40 that has transferred the authority can disjoin the conference. Even if the original organizer (the user of the IP telephone terminal 40 that has the authority for organizing the conference) disjoins the conference, it is properly continued by the other IP telephone terminals 40.

When an IP telephone terminal 40 that has an authority for organizing a conference transmits an authority transferring packet (joined terminal table operation commanding packet) that contains authority transferring information that represents that an authority for organizing a conference is transferred to the telephone exchanging apparatus 30A, an authority for organizing a conference can be transferred. The authority transferring packet contains information that represents that an authority for organizing a conference will be transferred and terminal identification information that identifies an IP telephone terminal 40 that will have the transferred authority.

After the telephone exchanging apparatus 30A has received the joined terminal table operation commanding packet from an IP telephone terminal 40, the telephone exchanging apparatus 30A checks whether or not the IP telephone terminal 40 has an authority for organizing a conference. When the checked result represents that the IP telephone terminal 40 has the authority for organizing the conference, the telephone exchanging apparatus 30A rewrites a field "authority information" of the IP telephone terminal 40 of the joined terminal table 341A.

As with the IP telephone terminal 40 that originally had the authority for organizing the conference, when the IP telephone terminal 40 that newly has the authority for organizing the conference transmits the joined terminal table operation commanding packet and operates the joined terminal table 341A, the IP telephone terminal 40 can for example terminate and divide the conference. An IP telephone terminal that has the authority for organizing the conference is exchanged.

On the other hand, the IP telephone terminal 40 that has transferred the authority for organizing the conference can operate the joined terminal table 341A no more. When necessary, if an IP telephone terminal 40 renounces an authority for joining a conference, the IP telephone terminal 40 can disjoin the conference. For example, when the user of an IP telephone terminal 40 hooks on the handset, he or she can disjoin the conference. At that point, the IP telephone terminal 40 transmits an on-hook packet to the telephone exchanging apparatus 30A. As a result, the telephone exchanging apparatus 30A stops transmitting speech packets to the IP telephone terminal 40.

Other Embodiments

The present invention is not limited to the foregoing embodiments. In other words, the foregoing embodiments according to the present invention can be extended and/or modified.

For example, an external telephone terminal connected to the telephone line 20 can be joined to a conference. At that point, combined voice information of IP telephone terminals 40 that are joining the conference is transmitted to the external telephone terminal. On the other hand, packets (speech packets or a combined speech packet) that contain voice information of the external telephone terminal are transmitted to the IP telephone terminals 40 that are joining the conference.

At that point, a telephone number can be used as terminal identification information that identifies the external telephone terminal.

According to the forgoing embodiments, when an IP telephone terminal 40 is joined to a conference, it is checked. Alternatively, when an IP telephone terminal 40 is disjoined from a conference, it may be checked. Of course, when an IP telephone terminal 40 is joined to a conference, it may not been checked.

In addition, when the joined terminal table 341 is operated, an IP telephone terminal 40 may require the user to input a designated password. At that point, the joined terminal table operation commanding packet contains the password information. Only when the telephone exchanging apparatus 30 has checked that the password is correct, the IP telephone terminal 40 can operate the joined terminal table. Thus, the joined terminal table 341 can be prevented from being carelessly rewritten and thereby the conference from being confused.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A telephone exchanging apparatus to which a plurality of telephone terminals are connected, the apparatus comprising:
    a joined terminal table that stores terminal identification information that identifies a telephone terminal that joins a conference;
    a joined terminal table operating portion that operates the joined terminal table corresponding to joined terminal table operation commanding information that causes the joined terminal table to be operated;
    a receiving portion that receives a speech packet that contains voice information transmitted form a telephone terminal;
    a reception side designating portion that designates the reception side of the speech packet received by the receiving portion, the reception side corresponding to terminal identification information stored in the joined terminal table, a telephone terminal being designated as the reception side of the speech packet so that the reception side of the speech packet differs from the transmission side of the speech packet; and
    a transmitting portion that transmitting the speech packet to the reception side designated by the reception side designating portion.

2. The telephone exchanging apparatus as set forth in claim 1,
    wherein the joined terminal table operating portion at least either adds or deletes the terminal identification information to or from the joined terminal table.

3. The telephone exchanging apparatus as set forth in claim 1,
    wherein the joined terminal table operating portion performs to the joined terminal table at least one operation corresponding to a starting operation, a terminating operation, a dividing operation, and a merging operation for a conference.

4. The telephone exchanging apparatus as set forth in claim 1,
    wherein the joined terminal table contains conference identification information that identifies the conference.

5. The telephone exchanging apparatus as set forth in claim 1,
    wherein the speech packet contains conference identification information that identifies the conference.

6. The telephone exchanging apparatus as set forth in claim 1, further comprising:
    a combined speech packet generating portion that generates a combined speech packet of which a plurality of speech packets are combined.

7. The telephone exchanging apparatus as set forth in claim 1, further comprising:
    a joined terminal informing portion that informs of a telephone terminal that will join the conference the transmission side of joining terminal inquiring information that inquires the telephone terminal that will join the conference corresponding to the joined terminal table.

8. The telephone exchanging apparatus as set forth in claim 1, further comprising:
 a terminal state recognizing portion that recognizes the states of the telephone terminals;
 a terminal state table that stores terminal state information of the telephone terminals recognized by the terminal state recognizing portion; and
 a terminal state informing portion that informs of the states of the telephone terminals the transmission side of terminal state inquiring information that inquires the states of the telephone terminals corresponding to the terminal state table.

9. The telephone exchanging apparatus as set forth in claim 8,
 wherein when a packet has not been received from a telephone terminal in a predetermined time period, the terminal state recognizing portion recognizes that the terminal state of the telephone terminal is not seating.

10. The telephone exchanging apparatus as set forth in claim 8,
 wherein when a speech packet has been received from a telephone terminal, the terminal state recognizing portion recognizes that the terminal state of the telephone terminal is speaking.

11. The telephone exchanging apparatus as set forth in claim 10,
 wherein when an on-hook packet that represents the handset has been hooked on has been received from a telephone terminal, the terminal state recognizing portion recognizes that the terminal state of the telephone terminal is seating.

12. A telephone exchanging apparatus to which a plurality of telephone terminals are connected, the apparatus comprising:
 a joined terminal table that stores terminal identification information and conference identification information, the terminal identification information identifying a telephone terminal that will join a conference, the conference identification information identifying a conference;
 a joined terminal table operating portion that performs at least one of a conference dividing operation and a conference merging operation for the joined terminal table corresponding to joined terminal table operation commanding information that causes the joined terminal table to be operated;
 a receiving portion that receives a speech packet that contains voice information transmitted from a telephone terminal;
 a reception side designating portion that references the joined terminal table, determines a conference that the telephone terminal that has transmitted the speech packet will join, and designates other telephone terminals that will join the conference as the reception side to which the speech packet is transmitted; and
 a transmitting portion that transmits the speech packet received by the receiving portion to the reception side designated by the reception side designating portion.

13. A telephone exchanging apparatus to which a plurality of telephone terminals are connected, the apparatus comprising:
 a joined terminal table that stores terminal identification information and conference joined information, the terminal identification information identifying a telephone terminal that has an authority for joining a conference, the conference joined information representing whether or not a telephone terminal is joining the conference;
 a receiving portion that receives a speech packet that contains voice information transmitted from a telephone terminal;
 a reception side designating portion that designate the reception side of the speech packet received by the receiving portion, the reception side being a telephone terminal that is joining the conference corresponding to the conference joined information stored in the joined terminal table; and
 a transmitting portion that transmits the speech packet received by the receiving portion to the reception side designated by the reception side designating portion.

14. A telephone exchanging apparatus to which a plurality of telephone terminals are connected, the apparatus comprising:
 a joined terminal table that stores terminal identification information and conference organizing authority information, the terminal identification information identifying a telephone terminal that will join a conference, the conference organizing authority information representing an authority for organizing the conference;
 a joined terminal table operating portion that operates the joined terminal table corresponding to joined terminal table operation commanding information that causes the joined terminal table to be operated, the joined terminal table operation commanding information being received from a telephone terminal that has an authority for organizing the conference, the conference organizing authority of the telephone terminal being represented by conference organizing authority information being stored in the joined terminal table;
 a receiving portion that receives a speech packet that contains voice information transmitted from a telephone terminal; and
 a transmitting portion that transmits the speech packet received by the receiving portion.

15. A telephone system, comprising:
 a telephone exchanging apparatus to which a plurality of telephone terminals are connected, the apparatus having:
 a joined terminal table that stores terminal identification information that identifies a telephone terminal that joins a conference,
 a joined terminal table operating portion that operates the joined terminal table corresponding to joined terminal table operation commanding information that causes the joined terminal table to be operated,
 a receiving portion that receives a speech packet that contains voice information transmitted form a telephone terminal,
 a reception side designating portion that designates the reception side of the speech packet received by the receiving portion, the reception side corresponding to terminal identification information stored in the joined terminal table, a telephone terminal being designated as the reception side of the speech packet so that the reception side of the speech packet differs from the transmission side of the speech packet, and
 a transmitting portion that transmitting the speech packet to the reception side designated by the reception side designating portion, each of the telephone terminals connected to the telephone exchanging apparatus having:

a speech packet generating portion that generates a speech packet that contains voice information, a joined terminal table operation commanding portion that generates joined terminal table operation commanding information that causes the joined terminal table that stores terminal identification information that identifies a telephone terminal that will join a conference to be operated;

a transmitting portion that transmits a joined terminal table operation commanding packet that contains the joined terminal table operation commanding information generated by the joined terminal table operation commanding portion and the speech packet generated by the speech packet generating portion; and a receiving portion that receives the speech packet.

* * * * *

UNITED STATES PATENT AND TRADEMARK OFFICE
CERTIFICATE OF CORRECTION

PATENT NO. : 7,039,019 B2
APPLICATION NO. : 10/105254
DATED : May 2, 2006
INVENTOR(S) : Niiya et al.

It is certified that error appears in the above-identified patent and that said Letters Patent is hereby corrected as shown below:

Claim 1, column 22, line 25, change "form" to --from--.

Claim 1, column 22, line 35, change "that transmitting" to -- that transmits--.

Claim 13, column 24, line 9, change "designate" to --designates--.

Claim 15, column 24, line 55, change "form" to --from--.

Claim 15, column 24, line 65, change "that transmitting" to --that transmits--.

Signed and Sealed this

Twenty-ninth Day of August, 2006

JON W. DUDAS
*Director of the United States Patent and Trademark Office*